United States Patent
Smith et al.

(10) Patent No.: US 6,937,594 B2
(45) Date of Patent: Aug. 30, 2005

(54) LOOP BACK TESTING FOR MULTI-PROTOCOL HYBRID NETWORKS

(75) Inventors: David B. Smith, Hinsdale, IL (US); George Paul Wilkin, Bolingbrook, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 726 days.

(21) Appl. No.: 09/844,228

(22) Filed: Apr. 27, 2001

(65) Prior Publication Data

US 2002/0159393 A1 Oct. 31, 2002

(51) Int. Cl.[7] .......................... H04L 12/66; H04L 12/26
(52) U.S. Cl. .................. 370/352; 370/241.1; 370/248; 370/249
(58) Field of Search .............................. 370/241.1, 248, 370/249, 265, 312, 352, 354, 356, 389, 392

(56) References Cited

U.S. PATENT DOCUMENTS

| | | | |
|---|---|---|---|
| 4,745,593 A | 5/1988 | Stewart | 370/15 |
| 5,477,531 A | 12/1995 | McKee et al. | 370/17 |
| 5,563,875 A * | 10/1996 | Hefel et al. | 370/249 |
| 5,668,800 A * | 9/1997 | Stevenson | 370/248 |
| 5,793,976 A * | 8/1998 | Chen et al. | 709/224 |
| 6,079,036 A * | 6/2000 | Moharram | 714/712 |
| 6,466,548 B1 * | 10/2002 | Fitzgerald | 370/249 |
| 6,704,287 B1 * | 3/2004 | Moharram | 370/242 |

FOREIGN PATENT DOCUMENTS

EP  0777401  4/1997  ........... H04Q/11/04

\* cited by examiner

*Primary Examiner*—Afsar Qureshi

(57) ABSTRACT

A hybrid network (100) includes a plurality of network elements (102, 106, 110, 114) that are coupled together by communication links (116, 118, 120, 122, 124). The network elements operate on different communications protocols. A loop back test message traverses a path (140) across network elements to test the integrity and quality of the path. Each network element that receives the loop back message modifies the message in a predetermined manner. The originator of the message verifies that the message was modified in an appropriate manner and in an appropriate time frame to determine integrity and quality.

23 Claims, 2 Drawing Sheets

LOOP BACK TESTING FOR MULTI-PROTOCOL HYBRID NETWORKS

FIELD OF THE INVENTION

The invention generally relates to hybrid telecommunications networks, and in particular, to a method of loop back testing hybrid networks that include multiple protocol conversions.

BACKGROUND OF THE INVENTION

Hybrid networks that integrate packet networks with traditional analog and digital telephone networks are known. Hybrid networks generally include a conversion from one protocol to another protocol. For example, a hybrid network that integrates a high-speed data network, such as the Internet, with a public switched telephone network may include a conversion from an analog/time division multiplexed protocol to an Internet protocol (IP) in the path connecting the end-user to the access network. Also, an analog/TDM to IP conversion may be required at a path connecting a public switch to a transport network. Other protocol conversions may be required including conversions to and from an Asynchronous Transfer Mode (ATM) protocol.

Loop back testing in telecommunications and data networks is known. In the telecommunications art, loop back testing is used to test a customer loop to confirm that a path exists from one point to another, for example, from a central office switch to a customer premise. In data networks, a computer sends a test message to another computer that routes the message back to the originating computer for confirmation of the integrity of the path between the two computers.

Hybrid networks pose a challenge to loop back testing. In particular, since a loop back test in a hybrid network must traverse multiple protocol domains, a traditional loop back test failure is ambiguous with respect to path integrity. More specifically, a failure in a traditional loop back test in a hybrid network may indicate path integrity problems, protocol conversion problems, or even a quality of service problem. The nature of these problems varies significantly. And, solutions to the problems are dependent upon the nature of the problem.

Therefore, a need exists for an improved method of loop back testing for identifying problems in hybrid networks that include multiple protocol conversions.

SUMMARY OF THE INVENTION

In accordance with one aspect of the present invention, a method is provided for loop back testing in a hybrid network. The hybrid network includes a plurality of network elements that are coupled to each other via a plurality of communication links. At least some of the plurality of network elements convert one network protocol to another network protocol. The network protocols are, for example, an Internet protocol, a time division multiplexed protocol, an Asynchronous Transfer Mode (ATM) protocol, a digital telephony protocol and an analog telephony protocol. The method includes the step of transmitting a loop back test message from a first network element. The loop back test message is directed to traverse a plurality of network elements of the hybrid network and then return to the first network element. Each network element that receives the loop back test message adds a network identifier to the loop back test message to indicate that the particular network element received the test message. Each network element that receives the loop back test message also adds a protocol attribute to the loop back test message. The protocol attribute uniquely identifies the protocol conversion or other function that is performed by the network element. Preferably, the protocol attribute is a bit pattern, a tone or a function. When the first network element receives the loop back test message after it has traversed the hybrid network, the first network element verifies that the protocol attributes added by the network elements match expected protocol attributes. The network element may also verify the identifiers that are added to the loop back test message by the network elements. Preferably, the time required to transmit and receive the loop back test message is monitored.

In accordance with a preferred aspect of the above-described method, each network element that converts from a first network protocol to a second network protocol, generates two messages in response to receiving the loop back test message. The first message conforms to the first protocol in which the message was received. The second message is converted from the first protocol to the second protocol and then back to the first protocol. The first message and second message are sent to the originator of the loop back message for verification of path integrity, delay and protocol conversion.

In accordance with another aspect of the present invention, a loop back testing enabled network element is provided. This testing enabled network element is adapted to couple to a hybrid network that includes a plurality of network elements coupled to each other via a plurality of communication links. At least some of the plurality of network elements convert one network protocol to another network protocol. The testing enabled network element includes means for transmitting a loop back test message. The loop back test message is directed to traverse a plurality of network elements in the hybrid network and return to a first network element. The loop back testing message is adapted to be modified by each network element that receives the test message. More specifically, each network element that receives the loop back test message modifies the message to indicate an identifier for the network element and a protocol attribute that identifies a protocol conversion or other function performed by the network element. Preferably, the testing enabled network element also includes means for receiving the loop back test message and verifying that for each network element that received the loop back test message, the protocol attribute matches an expected protocol attribute. The loop back testing enabled network element may also verify the identifiers in the loop back test message.

DESCRIPTION OF THE PREFERRED EMBODIMENTS

Figure 1:
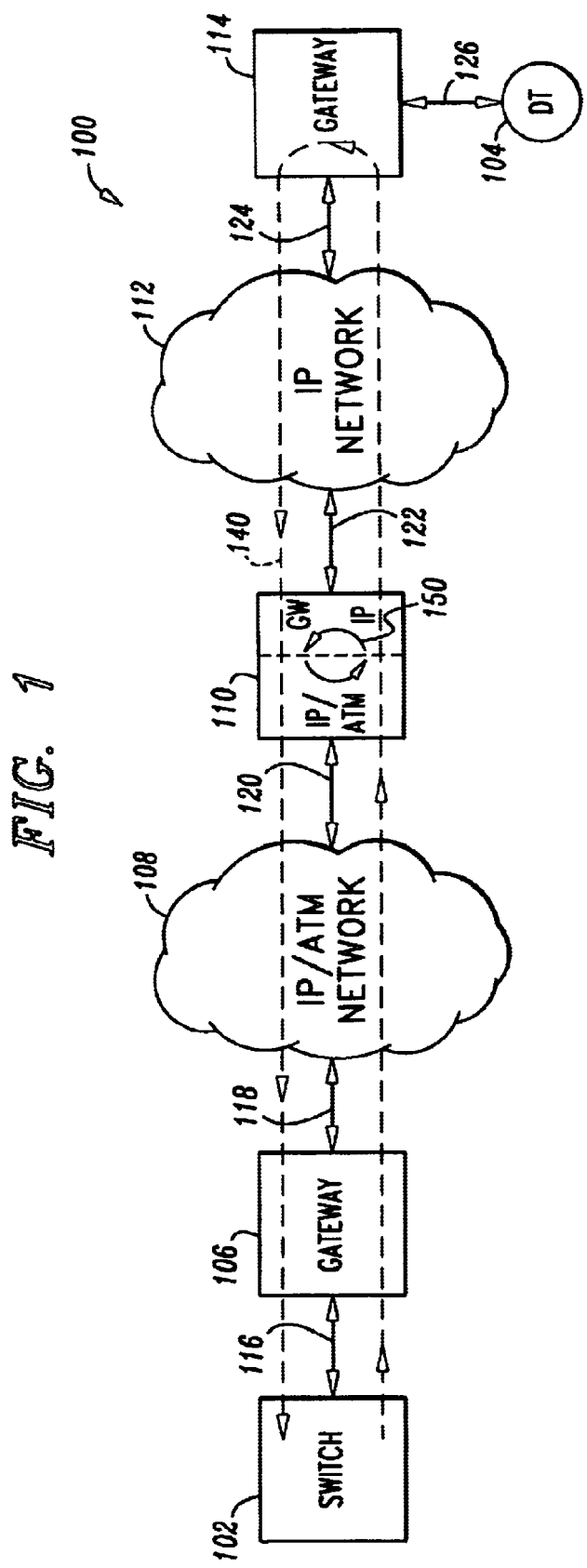
FIG. 1 is a block diagram of a hybrid network that employs loop back testing in accordance with the present invention.

FIG. 1 is a block diagram of a hybrid telecommunications network 100 that provides a loop back test in accordance with a preferred embodiment of the present invention. As exemplary shown in FIG. 1, network 100 couples a telephone switch 102 to a data terminal 104. Hybrid telecommunications network 100 includes a plurality of network elements that are coupled together via communication links. In particular, network 100 includes a telephone switch 102 that is coupled to a gateway 106 via a communication link 116. Gateway 106 is coupled to an IP/ATM network 108 via a communication link 118. IP/ATM network 108 is coupled to the gateway 110 via a communication link 120. Gateway 110 is coupled to an P network 112 via a communication link 122. IP network 112 is coupled to gateway 114 via a communication link 124. And, data terminal 104, which is, for example, a telephone, is coupled to gateway 114 via communication link 126.

Network 100 is a hybrid telecommunications network in the sense that multiple network protocols are used to traverse the network elements. In particular, telephone switch 102 communicates over communication link 116 with gateway 106 via a time division multiplex protocol. Gateway 106 communicates over communication link 118 with IP/ATM network 108 via an IP/ATM packet protocol. The IP/ATM packet protocol is maintained throughout IP/ATM network 108. Gateway 110 receives the IP/ATM packet protocol over communication link 120. Gateway 110 internally converts the IP/ATM packet protocol to an IP packet protocol that is communicated over communication link 122 to IP network 112. The IP protocol is maintained over IP network 112. Gateway 114 receives the IP protocol over communication link 124. An analog time division multiplex protocol is used for communication over communication link 126 between data terminal 104 and gateway 114.

The network elements of network 100 preferably vary in number and configuration. Preferably, the network elements are processor based and execute stored programs. Telephone switch 102 is any suitable telephone switch, for example, a 7 R/E™ switch available from Lucent Technologies Inc., Murray Hill, N.J. Similarly, any suitable gateways are found in network 100, including, for example, iMerge™ gateways (IP to GR-303) from Lucent Technologies Inc., Murray Hill, N.J. IP/ATM network 108 is preferably a homogeneous IP/ATM network comprising routers, ATM switches and communication links. Similarly, IP network 112 is preferably a homogeneous IP network comprising routers coupled together via communication links. The communications links vary with the associated protocol and are alternatively wired or wireless, including coaxial cable, fiber optic cable, wire, or a radio frequency channel. The network protocols are alternatively an Internet protocol, a time-division multiplex protocol, an asynchronous transfer protocol, a packet protocol, a digital telephony protocol and an analog telephony protocol.

In accordance with the present invention, a loop back test is conducted across hybrid network 100. An exemplary path for the loop back test is shown as path 140 in FIG. 1. As illustrated by path 140, a loop back test message is initiated at switch 102 and traverses gateway 106, IP/ATM network 108, gateway 110, IP network 112, and gateway 114. More specifically, the exemplary path 140 traverses gateway 106, IP/ATM network 108, gateway 110, and IP network 112 twice, once in a direction away from telephone switch 102 and again in a direction towards telephone switch 102. As discussed further below with respect to FIG. 2, as the loop back test message associated with the loop back test traverses path 140, each network element that receives the loop back test message modifies the loop back test message in accordance with an expected protocol that is then verified by the initiator of the loop back test message.

In accordance with another aspect of the present invention, a network element that converts from one protocol to another protocol periodically loops data from the first protocol to the second protocol and back to the first protocol in order to verify internally the protocol conversion. That is, real, versus test, data, is periodically selected to be converted between protocols and back to an original protocol for testing the protocol conversion. Alternatively, a predetermined packet is stored on one side (first protocol) of the protocol converting network element and a duplicate of that packet is converted to the second protocol then back to the first protocol by transfer to the other side of the protocol converting network element and then transfer back to the original side. Preferably, the results of the test are stored for subsequent examination, including comparison with known acceptable data. Most preferably, a count of the number of passing and failing tests is kept. The pass/fail counts are checked by a managing device, e.g., a gateway controller, or are placed in a loop back test. Gateway 110 shows an exemplary path 150 for performing a protocol analysis in a gateway in accordance with the present invention.

Figure 2:
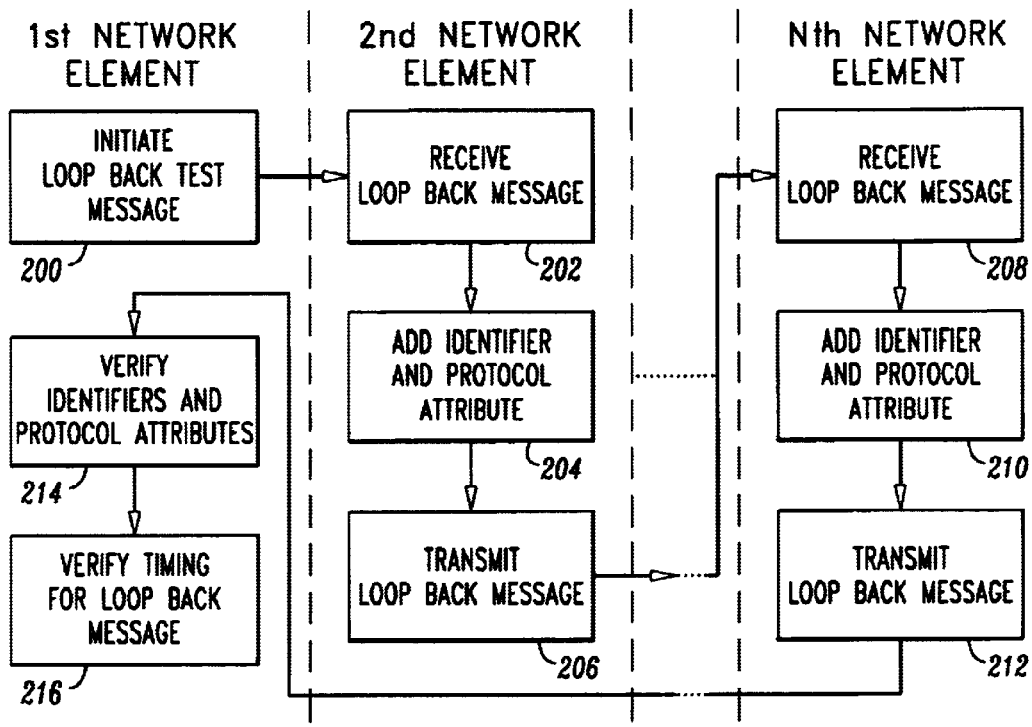
FIG. 2 is a flow chart illustrating a method for loop back testing in accordance with the present invention.

FIG. 2 is a flow chart illustrating a preferred method for performing a loop back test over a hybrid network 100 in accordance with the present invention. A first network element initiates the loop back test message (200). This preferably entails generating a predetermined test message and directing the test message across hybrid network 100 either through a specified path or to certain specific destinations. Preferably, a time associated with initiation or transmission of the loop back test message is stored. The time is alternatively stored and monitored by the first network element or used as a time stamp and placed directly in the loop back test message for monitoring by any network element that receives the message.

After the loop back test message is initiated, the loop back test message is transmitted to another network element. This second network element receives the loop back test message (202). The second network element, after determining the message is a loop back test message, performs expected procedures to modify the loop back test message. Preferably, the second network element adds an identifier and a protocol attribute to the loop back test message (204). The identifier preferably uniquely identifies the second network element for use in subsequently analyzing the test message. Preferably, based on a protocol of the second network element, a protocol attribute is added to the loop back test message. For example, gateway 106 converts from a time division multiplex protocol to an IP/ATM packet protocol. Hence, a protocol attribute specific for this conversion is inserted into the loop back test message by gateway 106. The protocol attribute is alternatively a specific bit pattern, a tone, or a function performed on data in the test message.

After the second network element modifies the loop back test message, the loop back test message is transmitted to the next network element. At the next network element, the loop back test message is received and modified in a manner similar to that performed by the second network element. The message is directed to traverse across multiple network elements until it reaches the final or Nth network element (208). In a preferred loop back test, the Nth network element is the same as the second network element. That is, in a preferred loop back test, the loop back test message traverses the network elements in between an initiator and a far end twice, once in a direction away from the initiator and once in a direction away from the far end. For example, for the loop back test path 140 shown in FIG. 1, telephone switch 102 is the initiator, and gateway 114 is the far end. All the network elements in between the initiator and the far end receive the loop back test message twice, once in one direction and again in the opposite direction.

The Nth network element also adds an identifier and protocol attribute to the loop back test message (210). The Nth network element transmits the loop back test message back to the first network element (212). The first network element then preferably verifies the identifiers added by the network elements that received the loop back test message (214). The first network element also verifies the protocol attributes added by the network elements (214). This may entail performing an inverse function performed by network element. To verify the identifiers and protocol attributes, the first network element may generate expected identifiers and protocol attributes based on its knowledge of the hybrid network. If only expected identifiers and protocol attributes are found in the loop back test message, the loop back test is successful. On the other hand, if an unexpected identifier or unexpected protocol attribute is found in the loop back test message, a potential problem may exist. Further loop back testing may be required to isolate a problem in a network element or communication link. In particular, in a preferred embodiment of the present invention, additional loop back test messages are conducted if an error is found in a loop back test message. Most preferably, the additional loop back test message destination or far end is changed in order to traverse a path to isolate faults in the path. For example, a loop back test message may be sent from switch 102 to gateway 106 and back to test the integrity of a path between the two. Then the loop back test message may be extended to the next network element for verification of integrity of this path. This process preferably continues until a problem is found and isolated. Also, any protocol converters, such as gateway 110, which may have conducted internal protocol conversion test, maybe used to determine whether there are problems.

If the loop back test message(s) identifies problems, then an alternate route may be selected, a new call set up or other corrective action taken. Preferably, where the loop back test is requested by a customer during a call, a new route for the call is established with the far end if a problem is detected. Most preferably, the parties on the call receive an indication that there will be a slight delay while the call is rerouted.

Preferably, the timing for the loop back test message is verified by first network element (216). This verification is made based on an internal timer of the first network element or by checking time stamps within the loop back test message.

Figure 3:
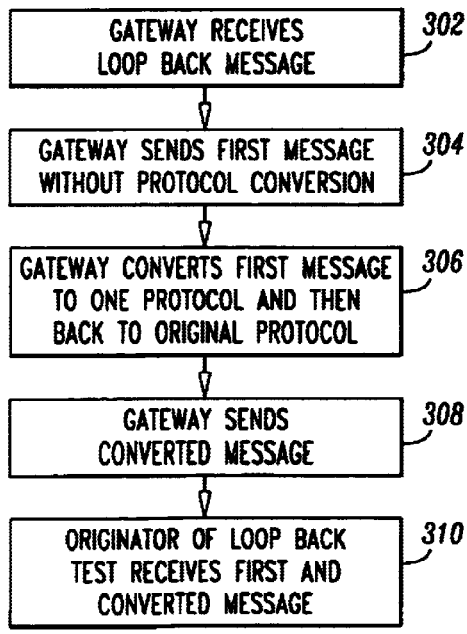
FIG. 3 is a flow chart illustrating a preferred method for loop back testing for network elements that perform protocol conversion in accordance with the present invention.

FIG. 3 is a flow chart illustrating a preferred method for testing protocol conversion elements in accordance with the present invention. More specifically, FIG. 3 shows a preferred method executed by gateways 106, 110, and 114 in accordance with the preferred method of the present invention. First, the gateway receives the loop back test message (302). In addition to passing the loop back test message along as modified in accordance with the preferred method described above with respect to FIG. 2, the gateway generates two messages for verifying path integrity, delay and protocol conversion, as discussed further below.

After the gateway receives the loop back test message (302), the gateway generates a first message that does not include any protocol conversion (304). For example, when gateway 110 receives an IP/ATM loop back test message from IP/ATM network 108, gateway 110 generates a first message conforming to the IP/ATM protocol. This first message is then set to the originator of the loop back test message. In the example described above in FIG. 2, the loop back test message is sent back to switch 102. Preferably, the first message includes a time stamp or other time identifier that identifies when the first message was generated or transmitted. Most preferably, the first message includes an attribute to indicate the state of the first message, including whether protocol conversion was performed on the message.

After generating and sending the first message without protocol conversion (304), the gateway converts the first message to one protocol and then back to the original protocol (306). That is, where the gateway does a protocol conversion, the second message is converted to the protocol and back to an original protocol. In the example discussed above with respect to FIG. 2, when gateway 110 receives the loop back test message, which is originally in an IP/ATM protocol, gateway 110 converts that message to a corresponding message in IP protocol. Then the IP protocol message is converted back to an IP/ATM protocol. That protocol-converted message is then sent by the gateway back to the originator of the loop back test (308). Preferably, the protocol-converted message is time stamped or includes a time identifier as well. Most preferably, the protocol-converted message includes an attribute to indicate the state of the message, including whether protocol conversion was performed on the message.

In the preferred method, the originator of the loop back test receives the first message (304) and the protocol-converted message (308), and compares those messages to determine the accuracy of the protocol conversion, the integrity of the path, and the delay for protocol conversion and path delay (310).

A loop back test message is transmitted from network element to network element until it returns to the originator of the message. As each network element receives the message it modifies the message in a predetermined manner that is unique to a function performed by the network element. The originator of the test message verifies the message's content upon receipt to determine the quality and integrity of a path traversed by the test message. The loop back test message is sent at varying intervals, including periodically, based on random timing, prior to establishing a communication path, during a communication, at a customers request, in response to a route failure, based on lost packets, based on retransmission requests, based on reroute requests, to determine route failures, or otherwise to adjust quality or determine quality. The results of loop back testing are preferably reported to a monitoring system.

Whereas the present invention has been described with respect to specific embodiments thereof, it will be understood that various changes and modifications will be suggested to one skilled in the art and it is intended that the invention encompass such changes and modifications as fall within the scope of the appended claim.

What is claimed is:

1. A method for loop back testing in a hybrid network that includes a plurality of network elements coupled to each other via a plurality of communication links, where at least some of the plurality of network elements convert one network protocol to another network protocol, the method comprising the steps of:

transmitting a loop back test message from a first network element of the plurality of network elements, wherein the loop back message is directed to traverse a plurality of network elements and return to the first network element;

wherein each network element of the plurality of network elements that receives the loop back test message:
  adds a network identifier to the loop back test message to indicate that the each network element received the loop back test message; and
  adds a protocol attribute to the loop back test message, wherein the protocol attribute represents a protocol conversion performed by the each network element.

2. The method of claim 1 further comprising the step of: the first network element receiving the loop back test message and verifying that for the each network element that received the loop back test message, the protocol attribute in the loop back test message matches an expected protocol attribute.

3. The method of claim 2 further comprising the step of: monitoring a time from the step of transmitting the loop back test message from the first network element to the step of receiving the loop back test message at the first network element.

4. The method of claim 1 further comprising the step of: the first network element receiving the loop back test message and verifying that for the each network element that received the loop back test message, the identifier in the loop back test message matches an expected network identifier.

5. The method of claim 4 further comprising the step of: monitoring a time from the step of transmitting the loop back test message from the first network element to the step of receiving the loop back test message at the first network element.

6. The method of claim 1 wherein the one network protocol is one of an Internet protocol, a time-division multiplex protocol, an asynchronous transfer protocol, a packet protocol, a digital telephony protocol and an analog telephony protocol.

7. The method of claim 1 wherein the another network protocol is one of an Internet protocol, a time-division multiplex protocol, an asynchronous transfer protocol, a packet protocol, a digital telephony protocol and an analog telephony protocol.

8. The method of claim 1 wherein the protocol attribute is one of a bit pattern, a tone, and a function.

9. The method of claim 1 wherein the loop back test message specifies a path to traverse from the first network element back to first network element.

10. The method of claim 1 wherein the loop back test message does not specify a path to traverse from the first network element back to the first network element.

11. The method of claim 1 wherein, in response to receiving the loop back message, at least one network element that converts from a first network protocol to a second network protocol:
  sends a first message to the first network element, wherein the first message corresponds to the first network protocol and is not converted to the second network protocol by the at least one network element that converts from the first network protocol to the second network protocol; and
  sends a second message to the first network element, wherein the second message corresponds to the first network protocol and is converted to the second network protocol and then back to the first network protocol by the at least one network element that converts from the first network protocol to the second network protocol.

12. The method of claim 1 wherein the first message and the second message each include a time identifier.

13. The method of claim 11 further comprising the step of: the first network element comparing the first message with the second message.

14. A loop back testing enabled network element coupled to a communication link, wherein the communication link is adapted to connect to a hybrid network that includes a plurality of network elements coupled to each other via a plurality of communication links, where at least some of the plurality of network elements convert one network protocol to another network protocol, the loop back testing enabled network element comprising:
  means for transmitting a loop back test message, wherein the loop back message is directed to traverse a plurality of network elements and return to a first network element;
  wherein each network element of the plurality of network elements that receives the loop back test message:
    adds a network identifier to the loop back test message to indicate that the each network element received the loop back test message; and
    adds a protocol attribute to the loop back test message, wherein the protocol attribute represents a protocol conversion performed by the each network element.

15. The loop back testing enabled network element of claim 14 further comprising:
  means for receiving the loop back test message and verifying that for the each network element that received the loop back test message, the protocol attribute in the loop back test message matches an expected protocol attribute.

16. The loop back testing enabled network element of claim 15 further comprising:
  means for monitoring a time from the step of transmitting the loop back test message to the step of receiving the loop back test message.

17. The loop back testing enabled network element of claim 15 wherein the means for transmitting and the means for receiving includes a processor.

18. The loop back testing enabled network element of claim 14 further comprising:
  means for receiving the loop back test message and verifying that for the each network element that received the loop back test message, the network identifier in the loop back test message matches an expected network identifier.

19. The loop back testing enabled network element of claim 18 further comprising:
  means monitoring a time from the step of transmitting the loop back test message to the step of receiving the loop back test message.

20. The loop back testing enabled network element of claim 18 wherein the means for transmitting and the means for receiving includes a processor.

21. The loop back testing enabled network element of claim 14 wherein the one network protocol is one of an Internet protocol, a time-division multiplex protocol, an asynchronous transfer protocol, a packet protocol, a digital telephony protocol and an analog telephony protocol.

22. The loop back testing enabled network element of claim 14 wherein the another network protocol is one of an Internet protocol, a time-division multiplex protocol, an asynchronous transfer protocol, a packet protocol, a digital telephony protocol and an analog telephony protocol.

23. The loop back testing enabled network element of claim 14 wherein the protocol attribute is one of a bit pattern, a tone, and a function.

* * * * *